United States Patent [19]
Bessette et al.

[11] Patent Number: 6,156,235
[45] Date of Patent: *Dec. 5, 2000

[54] CONDUCTIVE ELASTOMERIC FOAMS BY IN-SITU VAPOR PHASE POLYMERIZATION OF PYRROLES

[75] Inventors: Michael D. Bessette, Storrs; Robert A. Weiss, Mansfield Center, both of Conn.; Poh Poh Gan, Framingham, Mass.; Can Erkey, South Windsor, Conn.; Yueping Fu, Worcester, Mass.

[73] Assignee: World Properties, Inc., Lincolnwood, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 09/188,513

[22] Filed: Nov. 9, 1998

Related U.S. Application Data

[60] Provisional application No. 60/065,062, Nov. 10, 1997.
[51] Int. Cl.$^7$ .................................. H01B 1/06; C08J 9/36
[52] U.S. Cl. ............................... 252/511; 521/53; 521/54; 521/84.1; 521/90; 521/109.1; 521/134
[58] Field of Search ............................... 252/511; 521/53, 521/54, 134, 84.1, 90, 109.1

[56] References Cited

U.S. PATENT DOCUMENTS

| | | | |
|---|---|---|---|
| 4,136,238 | 1/1979 | Hilterhaus et al. | 252/511 |
| 4,731,408 | 3/1988 | Jasne | 252/511 |
| 5,415,934 | 5/1995 | Mori | 252/511 |
| 5,429,772 | 7/1995 | Castellucci et al. | 252/511 |
| 5,431,844 | 7/1995 | Nishiwaki | 252/511 |
| 5,686,183 | 11/1997 | Nishiwaki | 252/511 |

*Primary Examiner*—Morton Foelak
*Attorney, Agent, or Firm*—Cantor Colburn LLP

[57] ABSTRACT

A conductive elastomeric foam composite is presented, comprising an elastomer foam and polypyrrole, thiophene, or aniline and derivatives thereof. The foam is manufactured by first diffusing an oxidant into the dense polymer phase of a solvent-swollen foam and then diffusing pyrrole or pyrrole derivative vapor or solution into the dried foam, resulting in an in situ chemical oxidative polymerization of pyrrole at the oxidant site. Only about 5 wt % of conductive polymer is required for observing an insulator to conductor transition. The conductivity of the composite foam can be effectively controlled between $10^{-7}$ and $10^{-1}$ S/cm by varying either the amount of oxidant used and/or the copolymer composition.

9 Claims, 5 Drawing Sheets

CONDUCTIVE ELASTOMERIC FOAMS BY IN-SITU VAPOR PHASE POLYMERIZATION OF PYRROLES

This application claims priority to and incorporates by reference the provisional application of Yueping Fu et al., U.S. Provisional Application Ser. No. 60/065,062 filed Nov. 10, 1997.

BACKGROUND OF THE INVENTION

1. Field of the Invention

The present invention relates to conductive elastomeric foams. In particular, the present invention relates to methods of rendering insulative polymeric foams conductive.

2. Brief Summary of the Related Art

Conductive elastomers are well known for use in soling materials for shoes, in electrostatic dissipative (ESD) footwear, and in other applications which require ESD and Electromagnetic Interference/Radio Frequency Interference (EMI/RFI) shielding. Cellular elastomers, such as polyurethane foams, are presently rendered conductive by the incorporation of ionic compounds, but this approach has a number of drawbacks. The most serious of these is that the lowest electrical resistance (highest conductivity) achievable is a conductivity of about $1 \times 10^{-8}$ Siemens per centimeter (S/cm), the resistivity is also very sensitive to temperature and humidity (hygrothermal conditions), and the conductivity changes over time due to ion mobility and ion depletion.

Use of electrically conductive fillers can overcome some of these disadvantages, but it is difficult to achieve a target resistivity with conductive fillers in, for example, the $1 \times 10^{-6}$ to $1 \times 10^{-7}$ S/cm conductivity range due to the percolation threshold mechanism. At the percolation threshold concentration of an electrically conductive filler, the conductivity increases rapidly from that of an insulator to that of a semiconductor. As a result, the conductivity is very sensitive to small variations in filler concentration at the percolation threshold concentration. Moreover, resilient foams cannot be obtained in the range of conductivity required for Electromagnetic Interference/Radio Frequency Interference shielding applications, that is, most typically greater than about 0.10 S/cm.

Inherently conductive polymers may also be used in the form of blends or composites with other polymers, providing conductivity as well as improved mechanical properties and processability characteristics to the conductive blends or composites. During the past fifteen years, there has been significant progress in the synthesis of conductive organic polymers having novel electrical, optical and electrochemical properties. Among those conducting polymers, polypyrrole has been especially promising for commercial application, because of its good environmental stability and ready synthesis. Polypyrrole is ordinarily synthesized by either oxidative, chemical or electrochemical polymerization of pyrrole.

While polypyrrole is conductive, it is also insoluble and non-fusible. Polymerization of β- or N-substituted pyrrole with alkyl chains having more than six carbons yields polymers with improved solubility in organic solvents. However, because of stearic and/or electronic interactions, the conductivity of these substituted polypyrroles depends on the position of the alkyl substitution. The P-alkyl substituted polypyrroles thus exhibit conductivities one to two orders of magnitude lower than polypyrroles, and N-alkyl substituted polypyrroles have conductivities about five to six orders of magnitude lower than polypyrrole.

In addition to polypyrroles, copolymers of pyrrole and N-substituted pyrroles have advantageous conductive and other properties. The monomer oxidation potentials of pyrrole (1.15 volts (v) vs. Standard Colomel Electrode (SCE)) are very close, which indicates that the monomers have very similar polymerization reactivity. However, the polymer redox potential for polypyrrole about is 0.5 V less than poly(N-methylpyrrole) ("PMPy"), which indicates that polypyrrole is more oxidatively stable than poly(N-methylpyrrole). The conductivity of the copolymer depends upon the composition and is intermediate between that of polypyrrole (10–100 S/cm) and poly(N-methylpyrrole)($10^{-4}$–$10^{-5}$ S/cm).

Blends or composites of conductive polymers with other polymers are manufactured by either dispersing conducting polymer particles directly into an insulating polymer matrix, or by an in situ polymerization of the conducting polymer within a polymer host. The in situ polymerization of pyrrole by vapor phase polymerization within a polymer matrix containing a suitable oxidant has been reported. This approach has been used to prepare conductive blends based on a number of different polymer matrices, including poly (vinylchloride), poly(vinyl alcohol), cotton, poly(phenylene terephthalamide), and polyurethane as are described in "Conductive Polymer Blends Prepared by In Situ Polymerization of Pyrrole: A Review", *Polymer Engineering and Science*, December 1997, Vol. 37, No. 12, 1936–1943, the disclosure of which is incorporated herein by reference.

All of these polymers are dense polymers, that is, none are in the form of a foam. Foam presents particular problems for in situ vapor phase polymerization, because the conducting polymer must be restricted to the walls or struts of the foam. If the conducting polymer forms on the surface of the foam cells, it is too easily removed by abrasion or handling the foam. Formation of the polymer on the surface of the foam cells not only decreases the conductivity of the composites, but also may result in undesirable marking of surfaces which come into contact with the foam. (See "Preparation of Polypyrrole-Polyurethane Composite Foam by Vapor Phase Oxidative Polymerization", by He et al., *Journal of Applied Polymer Science*, Vol. 55, 283–287 (1995)). Accordingly, there remains a need in the art for a method of effective in situ polymerization of pyrroles and other monomers within a foam which result in stable, conductive blends and composites.

SUMMARY OF THE INVENTION

The above-discussed and other deficiencies of the prior art are alleviated by the composition and method of the present invention, wherein an elastomeric foam is first treated with a solution of a solvent and an oxidant that results in swelling of the elastomer and diffusion of the oxidant into the foam, followed by exposure of the treated foam to pyrrole-, thiophene-, and/or aniline-based monomer vapors or solutions, thereby forming pyrrole-, thiophene-, and/or aniline-based polymers uniformly within the foam. The presence of the pyrrole-, thiophene-, or aniline-based monomers converts insulative elastomer foams to conductive foams. The conductivities are adjustable within the range from about $10^{-1}$ to $10^{-7}$ S/cm, with such conductivities being stable over time.

The above-discussed and other features and advantages of the present invention will be appreciated and understood by those skilled in the art from the following detailed description and drawings.

BRIEF DESCRIPTION OF THE DRAWINGS

Referring now to the drawings, which are meant to be exemplary, not limiting, and wherein like elements are numbered alike in the several FIGURES.

DETAILED DESCRIPTION OF THE INVENTION

Figure 1:
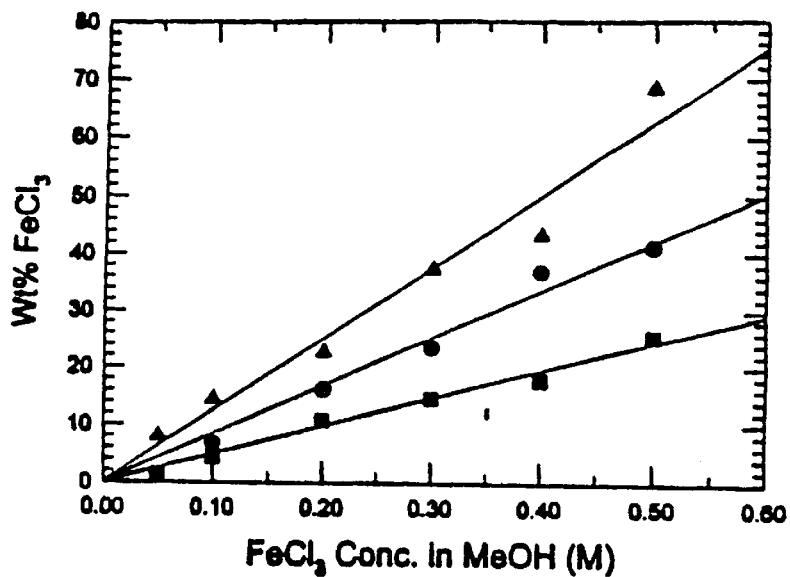
FIG. 1 is a graph of the iron(III) chloride uptake per unit of polyurethane foam as function of oxidant concentration for 3 different foam densities, 0.24 g/cm$^3$, 0.30 g/cm$^3$, and 0.35 g/cm$^3$.

Elastomer foams having electrically conductive organic polymers substantially uniformly distributed therein are provided by first treating a pre-formed foam with a solution of an oxidant which swells the foam and allows substantially even distribution of the oxidant in the walls and struts of the foam. The foam is then either dried and treated with electrically conductive polymer precursors typically either in the vapor phase or in solution of such polymer precursors and solvent. Polymerization occurs within the foam upon contact with the oxidant, and results in even distribution of the electrically conductive polymer primarily within polymeric regions of the foam, that is the walls and struts of the foam. Such foams have conductivities of about $1 \times 10^{-1}$ to about $1 \times 10^{-7}$ S/cm.

Elastomer foams, such as polyurethane foams, are well-known in the art. Polyurethane foams are ordinarily formed by the reaction of a diisocyanate with a polyol in the presence of a chemical or physical blowing agent. Particularly suitable elastomeric and polyurethane foams are available from Rogers Corporation, Rogers, Conn., under the trademark PORON®. Other elastomers or elastomeric foams which may be made conductive in accordance with the present invention include acrylics, silicone, neoprene, ethylene propylene rubbers, EPDM (ethylene propylene diene monomer), PVC (polyvinyl chloride), SBR (styrene butadiene rubber), mixtures thereof, and others that are swellable in the presence of a solvent.

Suitable solvents include those which will not degrade the foam, will effectively dissolve the oxidant, and preferably which are easily removed, such as methanol, ethanol, water, and mixtures thereof, among others, with solvents which readily dissolve in the oxidant preferred. Without being bound by theory, swelling of the elastomer foam aids in fast, even, and substantially uniform dispersion of the oxidant. Supercritical fluid solvents, such as supercritical carbon dioxide, are also particularly preferred in that use of such solvents result in cleaner waste solutions.

The foams are exposed to a solution of an oxidant capable of vapor-phase or pyrrole solution polymerization of the electrically conductive polymer precursor. For example, suitable oxidants for polymerization of pyrrole and N-methylpyrrole include, but are not limited to, iron(III) chloride, copper (II) iodide ($CuI_2$), iodide ($I_2$), ferric tosylate, combinations thereof, and the like. Iron(III) chloride is one of the preferred oxidants because of its relatively high solubility in methanol (MeOH), and ferric tosylate is preferred for obtaining a foam having better electric conductivity and greater stability, while iron(III)-trifluoromethane sulfonate ($Fe(CR_3SO_3)_3$) is preferred as the oxidant for use with supercritical fluid solvents due to its increased solubility in such supercritical fluid solvents.

After immersion in the oxidant solution, the treated foams are optionally dried in air and then exposed to the polymer precursor, such as pyrrole, vapor under static vacuum conditions. Alternatively, if supercritical fluid solvents are used, the treated foams may alternately be contacted with a polymer precursor solution in the supercritical fluid solvent or subjected to polymer precursor vapor.

The polymer precursor should be suitable for polymerization, including vapor phase deposition polymerization or solution polymerization, in the presence of the oxidant. Possible polymer precursors include, but are not limited to, pyrrole, N-methylpyrrole, aniline, and thiophenes, among others and combinations thereof, with pyrrole, N-methylpyrrole, and mixtures thereof preferred because pyrrole has a relatively low oxidation potential and a relatively high vapor pressure.

The following examples are provided for illustrative purposes and are not intended to limit the scope of the present invention.

EXAMPLE 1

This process was used to produce conductive polyurethane foam composites containing 1–36.6 wt % polypyrrole.

Pyrrole and N-methylpyrrole obtained from Aldrich Chemical Co. (Milwaukee, Wis.) were distilled and stored in a refrigerator. Iron(III) chloride hexahydrate, $FeCl_3.6H_2O$, (Aldrich, 98%), was used without any further purification. Iron(III) chloride solutions with different concentrations were prepared in methanol. Polyurethane foams with densities of 0.24 grams per cubic centimeter ("g/cm$^3$"), 0.30 g/cm$^3$ and 0.35 g/cm$^3$ were obtained from Rogers Corporation. The foam samples were cut to a size of 15×10×5 millimeter ("mm"). Conductivity measurements were made using a 4-probe method as follows. A testing fixture consisting of four parallel copper wires separated by 4 mm was pressed onto the foam samples. A constant current supplied by a Keithley 224 Programmable Current Source was applied through outer wires, and the voltage drop across inner wires was recorded with a Keithley 197 A Autoranging Microvolt DMM. Thermogravimetric analysis (TGA) was done with a Perkin-Elmer TGA-7 using a nitrogen atmosphere and a heating rate of 10° C./min. Scanning electron microscopy (SEM) was done with an AMR model 1200B microscope equipped with an Energy Dispensive X-Ray Analyzer ("EDAX") detector.

The polyurethane foam was first immersed in an iron(III) chloride/methanol solution for about 4 hours to swell the foam and allow the iron(III) chloride to diffuse into the foam. After incorporation of the oxidant, the foams were dried for 3 to 4 hours and were then exposed to pyrrole and/or N-methylpyrrole vapor with known molar feed ratios for the vapor phase polymerization in a desiccator, under pressure of about 0.5 torr. Following the vapor phase polymerization, the composite foams were washed with methanol several times to remove unreacted oxidant and by-products (e.g., $FeCl_2$), and dried in air for 1 to 2 hours and under vacuum for 24 hours. The polypyrrole concentration was determined by measuring the mass change of the foam before and after polymerization.

By controlling the oxidant concentration of the solution used for the imbibing step, a series of foams containing different amounts of iron(III) chloride were obtained. FIG. 1 shows the oxidant uptake in foams with three different densities as a function of the iron(III) chloride/methanol solution concentration. The iron(III) chloride uptake in each foam increased linearly with increasing oxidant concentration in the swelling solution. For a fixed iron(III) chloride concentration in the swelling solution, the concentration of oxidant incorporated into the foam increased with decreasing foam density.

Figure 2:
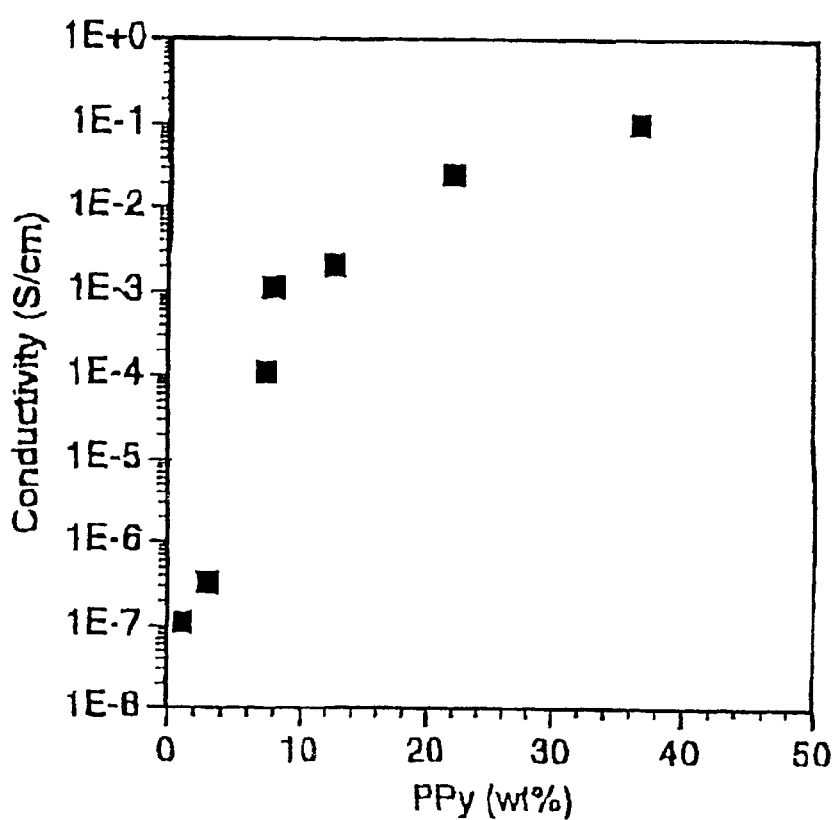
FIG. 2 is a graph of conductivity of polypyrrole/ polyurethane foams vs. polypyrrole content wherein the foam density is 0.25 g/cm$^3$.

The amount of polypyrrole produced upon exposure to pyrrole vapor was dependent on the iron(III) chloride concentration in the foam. FIG. 2 shows the conductivity of the polypyrrole/polyurethane foams as a function of the polypyrrole concentration. The percolation threshold concentration, i.e., the insulator to conductor transition, occurred at a polypyrrole concentration around 5 wt % based upon the total weight of the composite foam. The conductivity of the composite foam increased monotonically with polypyrrole concentration and a value of 0.1 S/cm was achieved for a polypyrrole concentration of 36.6 wt %. Normally, for a dense material filled with conductive particles, the percolation threshold concentration for conductivity is about 16 volume % ("vol %"). For the polypyrrole/polymer composites, vol % and wt % values are about the same because the densities of most organic polymers are fairly similar (0.9–1.2 $g/cm^3$).

The unusually low percolation threshold concentration for the foam arises because the polypyrrole is incorporated only into the polymeric regions of the foam, that is, the walls and struts. However, even when one considers only the concentration of polypyrrole within the polyurethane phase, the threshold concentration is low. This suggests that the polypyrrole may have a preferred orientation within the struts of the foam.

Figure 3:
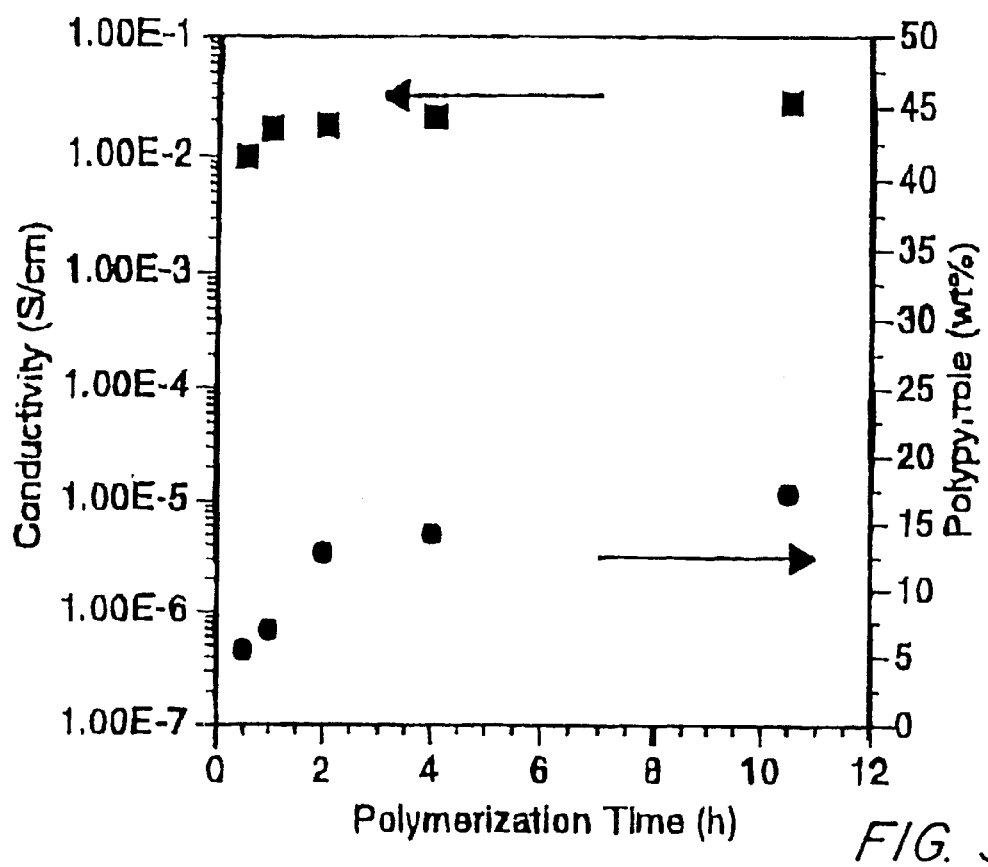
FIG. 3 is a graph of the polypyrrole content and conductivity as function of polymerization time, starting with 70 weight percent ("wt %") iron(III) chloride in the polyurethane foam (foam density =0.24 g/cm$^3$).

The kinetics of the vapor phase polymerization of pyrrole in the foams was also studied. FIG. 3 shows the polypyrrole production in the composite foam and the conductivity as a function of polymerization time for a composite prepared from a foam containing 70 wt % iron(III) chloride/polyurethane. The polymerization was essentially complete after about 4 hours. However, most of the conductivity was developed within the first thirty minutes of the polymerization, during which the polypyrrole content reached about 5 wt %. From 0.5 to 10 hours exposure to the pyrrole vapor, the conductivity increased only slightly from 0.01 to 0.05 S/cm. One reason for the result may be that the 4-probe method for measuring conductivity is most sensitive to the surface conductivity. Since the vapor phase in situ polymerization proceeds from the surface of the foam inwards as a result of the diffusion controlled polymerization process, surface conductivity is established early in the polymerization.

The effect of vapor phase in situ copolymerization of pyrrole and N-methylpyrrole was also studied. Pyrrole and N-methylpyrrole have comparable oxidation potentials and both may be polymerized by either electrochemical or chemical oxidative polymerization.

The conductivity of polypyrrole is about 5 orders of magnitude greater than that of poly(N-methylpyrrole) possibly due to steric hindrance and/or electronic interaction. Copolymers of pyrrole and N-methylpyrroles have been synthesized by electrochemical methods, and their conductivity varies with the comonomer feed ratio used.

The vapor pressures ($P_i^*$) of pyrrole and N-methylpyrrole at 25° C. are 8.25 mm Hg (millimeters of mercury) and 21.36 mm Hg, respectively. Assuming an ideal vapor and solution for pyrrole and N-methylpyrrole mixtures, the partial pressure ($P_i$) of each component in the vapor may be estimated from Raoult's law ($P_i=x_iP_i^*$, where $x_i$ is the mole fraction in the solution). For the vapor phase polymerization used here, the mole fractions in the vapor ($y_i=P_i/P$, where $P_i$ represents the individual contribution to vapor pressure and P represents the measured vapor pressure of the reaction) constitute the feed composition. Since previous work showed that the reactivities of the two monomers are essentially the same (i.e., the polymer composition equals the feed composition), it is assumed that this is also true for the vapor phase polymerization.

EXAMPLE 2

This process demonstrates the use of supercritical carbon dioxide in the in situ polymerization of pyrrole within polyurethane foams.

Polymerization was also carried out with supercritical carbon dioxide ($SCCO_2$) using iron(III)-trifluoromethane sulfonate ($Fe(CF_3SO_3)_3$) as an oxidant. Iron(III)-trifluoromethane sulfonate was made by first reacting iron (III) chloride with sodium hydroxide to form iron(III) trihydroxide ($Fe(OH)_3$), which was then reacted with trifluorosulfonic acid ($CF_3SO_3H$). A set of experiments were then carried out to impregnate the foams from iron(III)-trifluoromethane sulfonate solutions in supercritical carbon dioxide.

The impregnation of polyurethane (PU) foam specimens, 15×5×2 mm, was conducted at 45° C. and 238 atmospheres ("atm") in batch mode in a 10 $cm^3$ high pressure vessel. The polyurethane foams were swelled with iron(III)-trifluoromethane sulfonate in supercritical carbon dioxide solution for various times, specifically 1, 2, 4, 17, and 24 hours. The amount of impregnated oxidant was determined gravimetrically after depressurization. The amount of iron (III)-trifluoromethane sulfonate uptake per unit of polyurethane increased linearly with the square root of time, which indicates Fickian diffusion of iron(III)-trifluoromethane sulfonate into the polymeric matrix.

Impregnated foams were then subjected to either pyrrole vapor or, alternatively, a pyrrole solution in supercritical carbon dioxide. The resulting foam had similar mechanical and electrical properties to the foam subjected to pyrrole vapor. Finally, the polyurethane foams were either washed with methanol several times or, alternatively, washed with supercritical carbon dioxide, to remove unreacted oxidant and/or any by-products. Due to the decreased solubility of the polymerization byproducts in supercritical carbon dioxide, however, such treatment was less preferred than use of methanol.

The polypyrrole produced in the polyurethane foam was controlled by the amount of iron(III) chloride in the polyurethane foam. The conductivity of the composite foam increased monotonically with the immersion time and a value of 0.03 S/cm was achieved for 24 hour immersion. The polypyrrole weight content in the polyurethane foams was estimated to be 3 wt % or less for most conductive samples. Normally, for a dense material filled with spherical conductive particles, the percolation threshold concentration for conductivity is 16% by volume. For polypyrrole/polymer composites, that vol % value corresponds to nearly the same value in wt %, since the densities of most organic polymers are fairly similar (0.9–1.2 g/cm$^3$).

As determined by thermogravimetric analysis, both polyurethane and polypyrrole/polyurethane composites lost less than 3% of the mass below 300° C. The polypyrrole/polyurethane started to degrade at 320° C., while neat polyurethane started at a temperature of 10–20° C. higher. The mass loss profiles of the two samples between 0° C. and 450° C. were similar, which indicates that the in situ polymerization process did not degrade the polyurethane foam. The final weight difference at 700° C. is due to the polypyrrole contents in the polyurethane foam.

Figure 4:
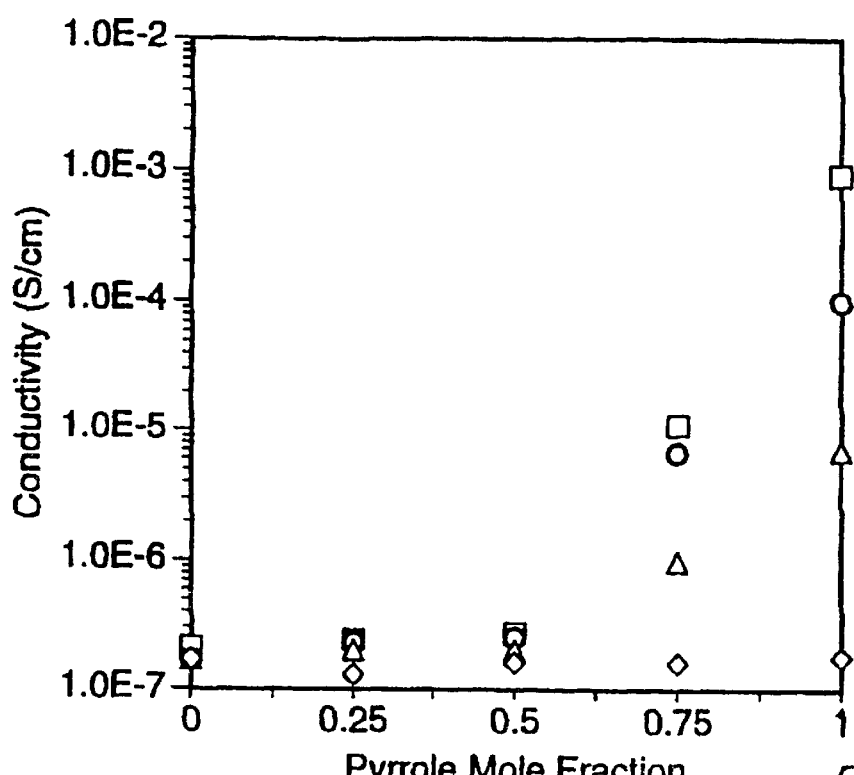
FIG. 4 is a graph of the conductivity of pyrrole and N-methylpyrrole copolymer/polyurethane foam vs. pyrrole mole fraction starting with 69 wt % iron(III) chloride in polyurethane, 43 wt % iron(III) chloride in polyurethane, 37 wt % iron(III) chloride in polyurethane and 14 wt % iron(III) chloride in polyurethane.

Copolymerization of pyrrole and N-methylpyrrole was carried out within foams containing different quantities of oxidant. As shown in FIG. 4, varying the monomer molar feed ratios and the oxidant concentration yielded copolymer/polyurethane composites having conductivities that varied over four orders of magnitude. The conductivities of the copolymer composites exhibited a nonlinear decrease as the pyrrole mole fraction decreased, possibly because the incorporation of N-methylpyrrole in the polymer decreases the mobility and/or concentration of charge carriers which are essential for conductivity. Below a pyrrole mole fraction of about 0.5, the conductivities of the composites were relatively insensitive to the copolymer composition and exhibited conductivities on the order of $10^{-7}$ S/cm, which is similar to poly(N-methylpyrrole)/polyurethane composites.

Figure 5:
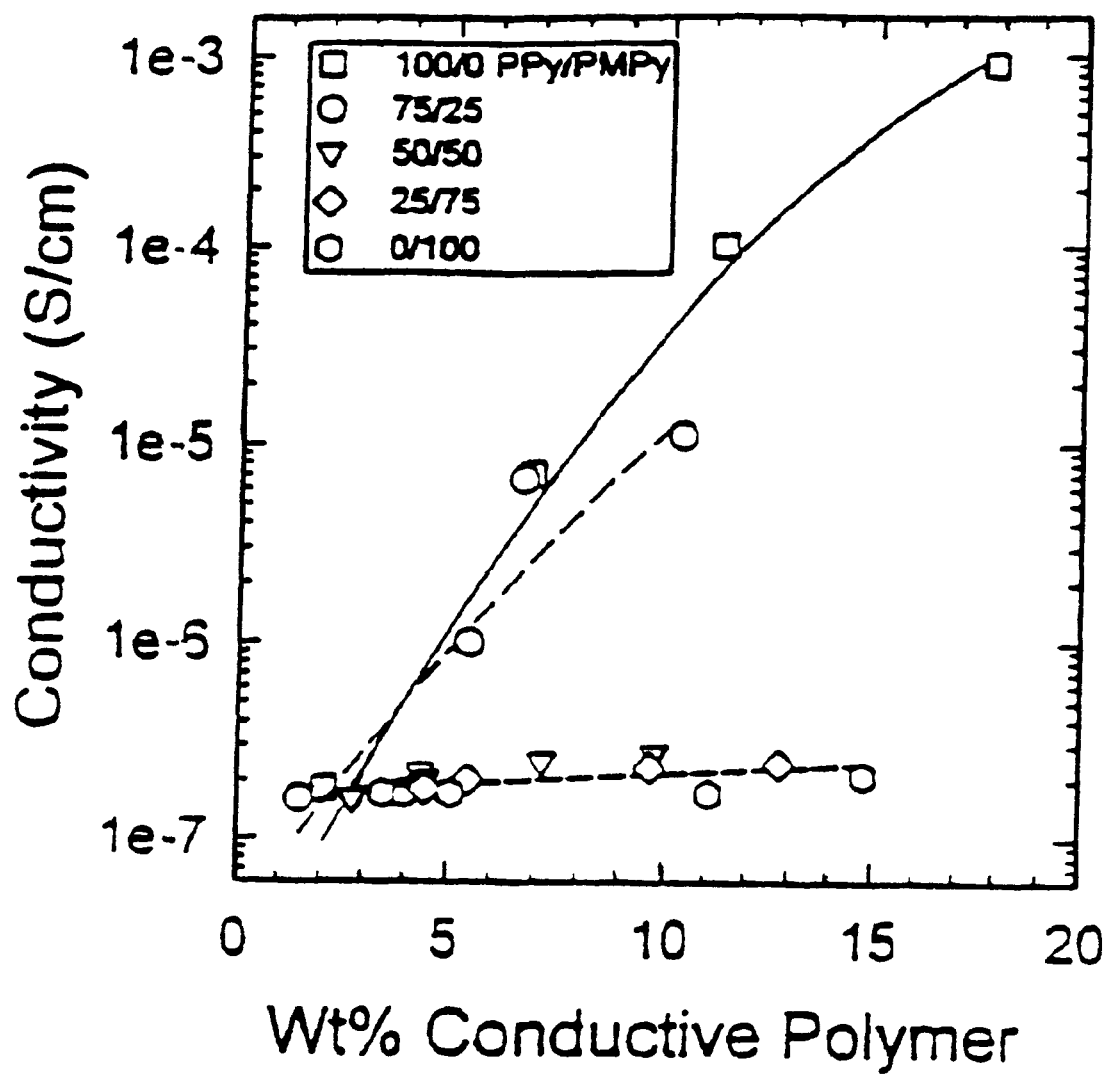
FIG. 5 is a graph of the conductivity of polypyrrole/poly-N-methyl pyrrole copolymer foams vs. wt % copolymer content at 5, pyrrole molar fractions 1, 0.75, 0.5, 0.25 and 0.0.

FIG. 5 shows the conductivity of copolymer/polyurethane foam composites for different copolymer compositions as function of the copolymer content of the composite. The graph shows that the electrical conductivity in the composite may be controlled by tailoring the copolymer composition, as well as the concentration in the composite of the conducting polymer. Conductivities in the range of $10^{-1}$ to $10^{-7}$ S/cm may be easily and reproducibly achieved.

Figure 6:
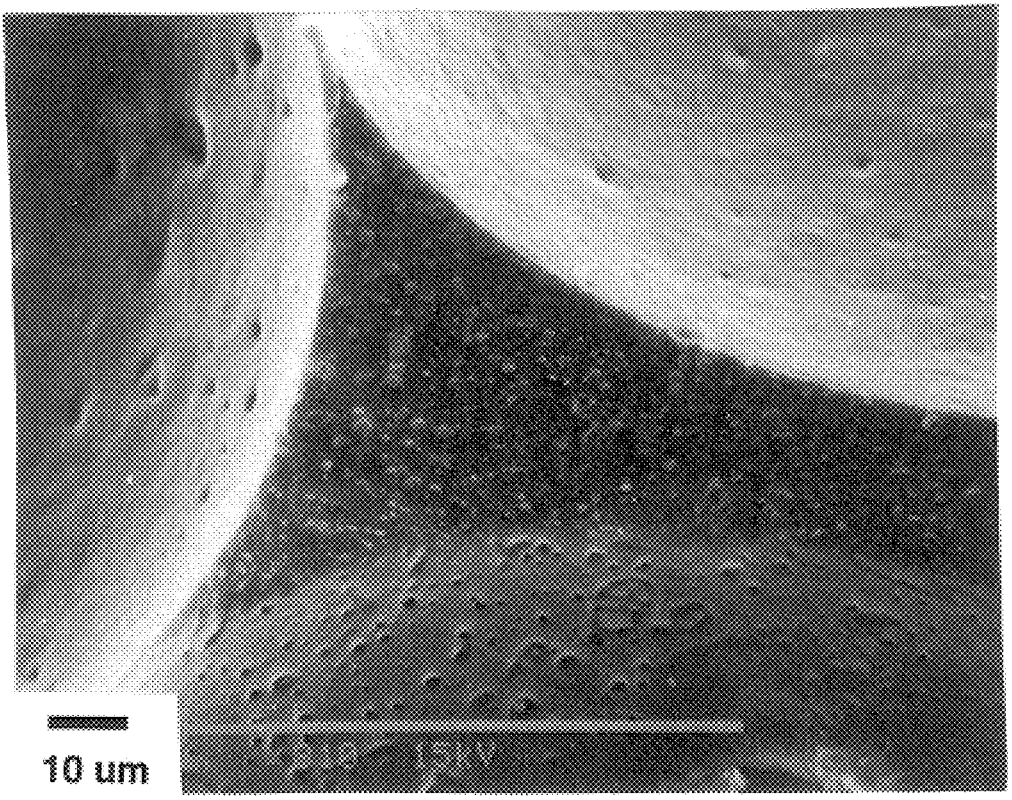
FIG. 6 is a graph showing a scanning electron micrograph (SEM) of 21.9 wt % polypyrrole in polyurethane foam.
Figure 6:
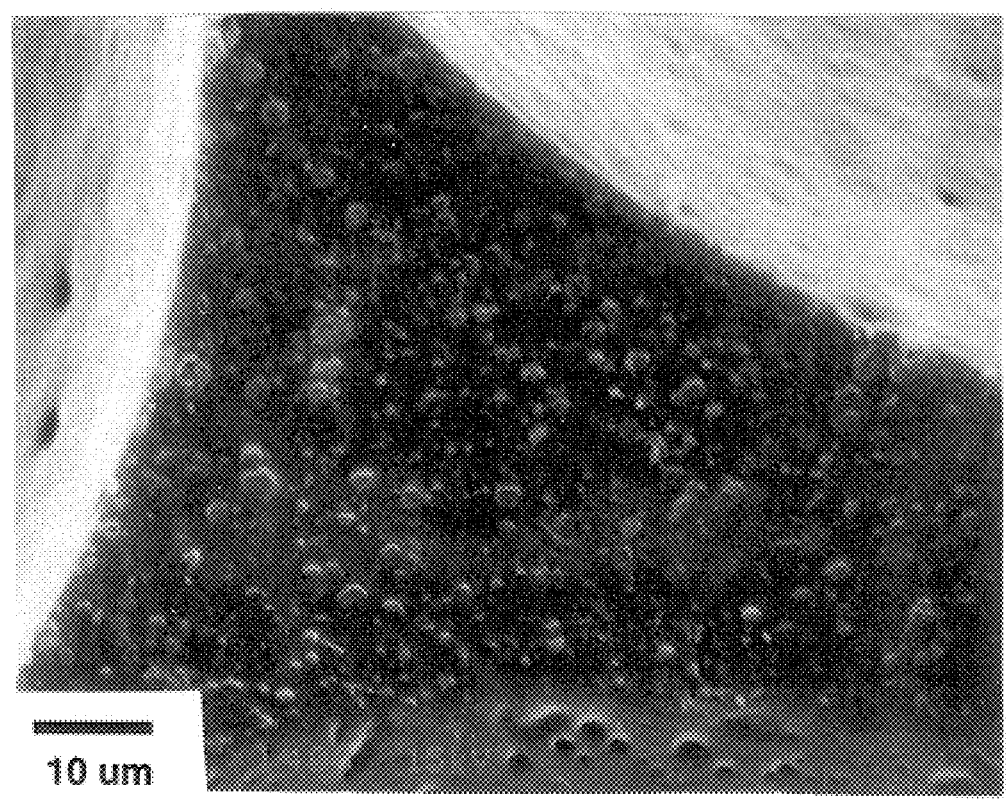
Figure 7:
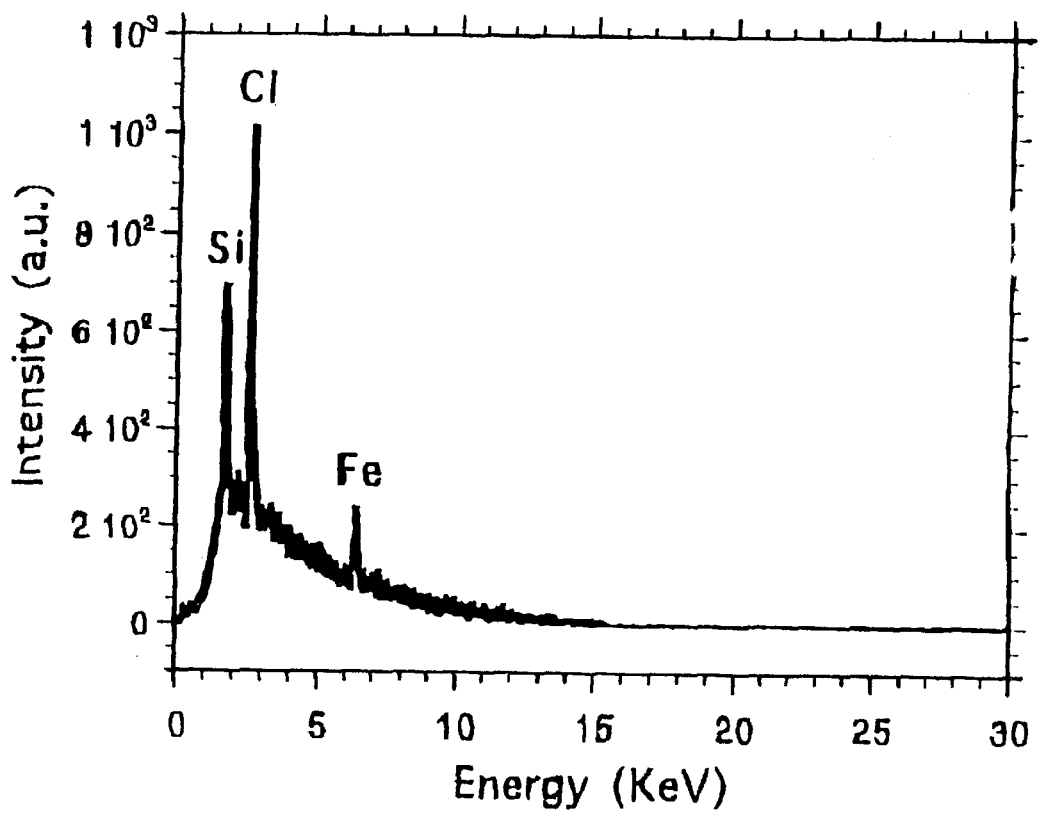
FIG. 7 is a graph showing the Energy Dispersive X-Ray Analyzer spectrum (EDAX) of 20.0 wt % polypyrrole in polyurethane foams.

The morphologies of the neat foam and a 21.9% polypyrrole/polyurethane foam were characterized by scanning electron microscopy (SEM). The cross-section of a polypyrrole/polyurethane foam as shown in FIG. 6 shows a relatively uniform distribution of polypyrrole within the polymeric cell walls and struts. No polypyrrole debris was observed either when the foam was cut for scanning electron microscopy or in the micrograph, which indicates that the polymerization technique effectively isolates the conductive polymer within the dense polymer phase. This was also confirmed by the absence of marking when the conductive foams were rubbed upon a price of white paper (neat polypyrrole is black and readily marks paper). The polypyrrole had a granular texture with a grain size of about 0.5 microns. The EDAX spectrum for a 20% polypyrrole/polyurethane composite, FIG. 7, shows three distinct emission peaks: silicon (Si) $K_\alpha$ (2.3 kiloelectron volts (keV)), chlorine (Cl) $K_\alpha$ (2.6 keV) and iron (Fe) $K_\alpha$ (6.4 keV), where $K_\alpha$ is the energy required to displace an electron from the "K" orbital. The silicon $K_\alpha$ peak is due to the surfactant used in preparation of the foam. The strong chlorine $K_\alpha$ peak is mostly due to chloride dopant ions for the polypyrrole, and the weak iron $K_\alpha$ peak may either be from dopant ions in the form of iron(IV) chloride ($FeCl_4$) or residual iron(II) chloride ($FeCl_2$) byproduct that was not removed during washing of the product.

Figure 8:
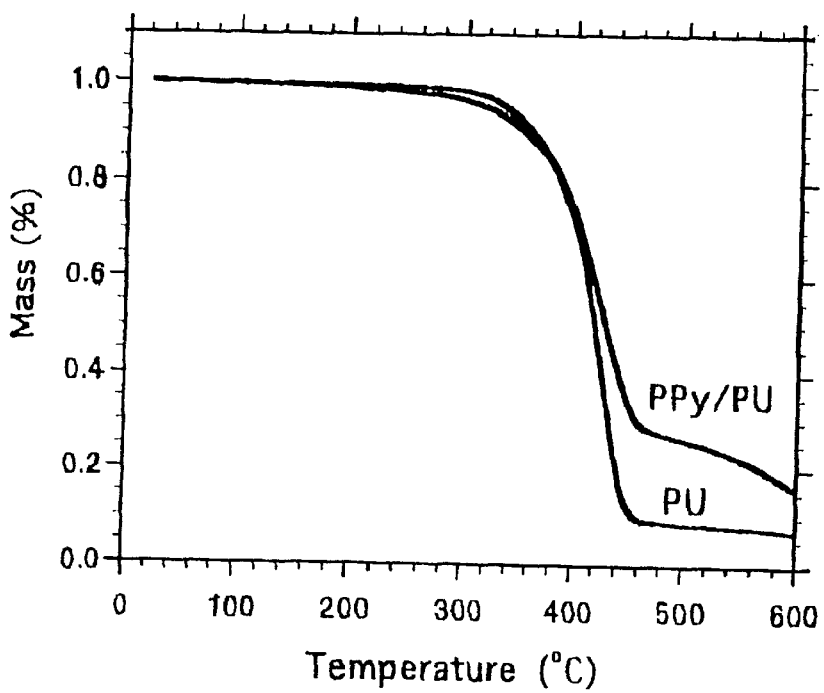
FIG. 8 is a graph showing a thermogravimetric analysis (TGA) of neat and 9.0 wt % polypyrrole in polyurethane composites.

Thermogravimetric analysis results for the neat polyurethane and a 9.0 wt % polypyrrole/polyurethane foam are shown in FIG. 8. Both polyurethane and polypyrrole/polyurethane composites lost less than 3% of the mass below 300° C. The mass loss profiles of the two samples between 0° C. and 400° C. were similar, which indicates that the in situ polymerization process probably did not degrade the foam. The final weight difference between the neat polyurethane foam and the composite at 600° C. is due to the presence of polypyrrole in the latter. The mechanical properties of a 6.0% polypyrrole/polyurethane composite and the neat polyurethane foam are shown in Table 1. The data in Table 1 indicates that incorporation of low concentration of polypyrrole into the foam was not deleterious to the foam mechanical properties. In addition, the resilience of the composite foam appeared to be qualitatively similar to that of the neat foam.

TABLE 1

| Property | Polyurethane Foam | 6.0% Polypyrrole/Polyurethane |
|---|---|---|
| Tensile Strength, N/m$^2$ (newtons per square meter) | 8.1 × 10$^5$ | 8.3 × 10$^5$ |
| Elongation at Break, % | 143 | 160 |
| Tear Strength, pli (pounds per linear inch) | 10 | 18 |
| Compression Set % | 3.5 | 3.7 |
| Conductivity, S/cm | <1 × 10$^{-10}$ | 1 × 10$^{-5}$ |

As the above description and Examples show, the present method produces conductive elastomeric foams by the polymerization of conductive polypyrrole or copolymers of pyrrole and substituted pyrrole in the cell walls and struts of a pre-formed polyurethane foam. Relatively low conductive polymer concentration, about 5 wt %, is required for observing an insulator to conductor transition. The conductivity of the composite foam can be effectively controlled between $10^{-7}$–$10^{-1}$ S/cm by varying either the amount of oxidant used, which controls the amount of conductive polymer produced, and/or the copolymer composition. The conductivity decreases as the concentration of N-methylpyrrole in the copolymer increases.

Use of the supercritical fluid (SCF) solvents of the present invention, such as supercritical carbon dioxide, as an alternative to organic solvents has the further advantage of eliminating the production of organic solvent waste contaminated with metal salts, the disposal of which is a major economic and environmental concern. Furthermore, carbon dioxide leaves no residue in the treated polymer.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for the manufacture of a conductive elastomeric foam composite, comprising:

providing a pre-formed elastomer foam having walls and struts;

treating the elastomer foam with a solution of a solvent and an oxidant, thereby impregnating said elastomer foam with said oxidant; and exposing the treated elastomer foam to a pyrrole-, thiophene-, aniline-based, or combination thereof, vapor, or a pyrrole-, thiophene-, aniline-based, or combination thereof, solution thereby forming pyrrole-, thiophene-, or aniline-based polymers within and throughout said walls, said struts, or a combination thereof, to yield an electrically conductive, elastomeric foam composite.

2. The method of claim 7, wherein
said pyrrole-, thiophene-, or aniline-based vapor or solution comprises one or more of pyrrole, N-methylpyrrole, aniline, or thiophenes.

3. The method of claim 1, wherein said solvent is methanol, ethanol, water or mixtures thereof.

4. The method of claim 1, wherein said solvent is a supercritical fluid.

5. The method of claim 4, wherein said solvent is supercritical carbon dioxide.

6. The method of claim 1, wherein said oxidant is iron(III) chloride, or ferric tosylate.

7. The method of claim 1, wherein said oxidant is iron (III)-trifluoromethane sulfonate.

8. The method of claim 1, wherein the composite has a conductivity in the range from $10^{-7}$–$10^{-1}$ S/cm.

9. The method of claim 1, wherein the conductive polymer comprises from about 1 to about 40 wt % of the total composite.

* * * * *